| (12) | United States Patent | (10) Patent No.: | US 12,448,972 B2 |
|---|---|---|---|
| | Kitayama et al. | (45) Date of Patent: | Oct. 21, 2025 |

(54) ELECTRIC OIL PUMP

(71) Applicant: NTN Corporation, Osaka (JP)

(72) Inventors: Naotsugu Kitayama, Shizuoka (JP); Masahiro Kawai, Shizuoka (JP); Kenji Mizushiri, Shizuoka (JP)

(73) Assignee: NTN CORPORATION, Osaka (JP)

( * ) Notice: Subject to any disclaimer, the term of this patent is extended or adjusted under 35 U.S.C. 154(b) by 83 days.

(21) Appl. No.: 18/031,502

(22) PCT Filed: Oct. 6, 2021

(86) PCT No.: PCT/JP2021/037041
§ 371 (c)(1),
(2) Date: Apr. 12, 2023

(87) PCT Pub. No.: WO2022/085457
PCT Pub. Date: Apr. 28, 2022

(65) Prior Publication Data
US 2023/0374993 A1   Nov. 23, 2023

(30) Foreign Application Priority Data

Oct. 19, 2020   (JP) .................................. 2020-175370
Mar. 24, 2021   (JP) .................................. 2021-050541

(51) Int. Cl.
*F04D 13/06*    (2006.01)
*F04D 25/06*    (2006.01)
*H02K 5/22*     (2006.01)

(52) U.S. Cl.
CPC ......... *F04D 13/0686* (2013.01); *F04D 13/06* (2013.01); *F04D 25/068* (2013.01); *H02K 5/225* (2013.01)

(58) Field of Classification Search
CPC .... F04D 13/0686; F04D 13/06; F04D 25/068; H02K 5/225
See application file for complete search history.

(56) References Cited

U.S. PATENT DOCUMENTS 6,808,372 B2 * 10/2004 Makino ................... F04C 28/08
                                                    417/410.5
6,896,494 B2 *  5/2005 Sunaga ................. F04D 13/064
                                                    417/423.1

(Continued)

FOREIGN PATENT DOCUMENTS

CN   207974955    10/2018
EP   2 789 857    10/2014

(Continued)

OTHER PUBLICATIONS

International Search Report issued Nov. 16, 2021, in International (PCT) Application No. PCT/JP2021/037041, with English translation.

(Continued)

*Primary Examiner* — Christopher S Bobish
(74) *Attorney, Agent, or Firm* — WENDEROTH, LIND & PONACK, L.L.P.

(57) ABSTRACT

An electric oil pump 1 includes: a pump unit 2 that generates hydraulic pressure; a motor unit 3 that drives the pump unit; a substrate 4 on which a control circuit for controlling the motor unit 3 is formed by a plurality of electronic components 41; and a housing 5 equipped with a pump accommodation unit 53 that houses the pump unit, a motor accommodation unit 54 that houses the motor unit, and a substrate accommodation unit 55 that houses the substrate. The substrate 4 is disposed along the tangential direction of a circle about the axis of the motor unit 3. The pump accommodation unit 53, the motor accommodation unit 54, and the substrate accommodation unit 55 are integrally formed.

14 Claims, 12 Drawing Sheets

(56) References Cited

U.S. PATENT DOCUMENTS

| | | | |
|---|---|---|---|
| 7,972,123 B2* | 7/2011 | Koide | F04B 39/121 |
| | | | 417/423.14 |
| 8,282,367 B2* | 10/2012 | Ihle | F04D 29/5813 |
| | | | 310/86 |
| 2005/0012387 A1 | 1/2005 | Suzuki et al. | |
| 2005/0063836 A1* | 3/2005 | Kimura | F04B 39/121 |
| | | | 417/313 |
| 2013/0195696 A1* | 8/2013 | Sugimura | H02K 11/33 |
| | | | 417/410.1 |
| 2013/0328424 A1 | 12/2013 | Goto | |
| 2014/0037472 A1 | 2/2014 | Hibi et al. | |
| 2014/0294624 A1 | 10/2014 | Suitou et al. | |
| 2017/0082104 A1* | 3/2017 | Yamamoto | F04C 15/0096 |
| 2018/0238348 A1* | 8/2018 | Pawellek | F04D 13/0693 |
| 2018/0274540 A1 | 9/2018 | Kataoka et al. | |
| 2019/0195345 A1* | 6/2019 | Kataoka | F01M 11/0004 |
| 2019/0195349 A1* | 6/2019 | Kataoka | H02K 5/225 |
| 2019/0301596 A1* | 10/2019 | Kobayashi | F16H 61/0031 |
| 2022/0224208 A1 | 7/2022 | Tomita et al. | |
| 2023/0407870 A1* | 12/2023 | Rathke | F04D 29/628 |

FOREIGN PATENT DOCUMENTS

| | | |
|---|---|---|
| JP | 2005-337095 | 12/2005 |
| JP | 2015-105601 | 6/2015 |
| JP | 2017-184542 | 10/2017 |
| JP | 2019-112977 | 7/2019 |
| JP | 2020-195196 | 12/2020 |
| JP | 2021-143660 | 9/2021 |
| WO | 2012/093678 | 7/2012 |
| WO | 2013/008266 | 1/2013 |
| WO | 2013/105360 | 7/2013 |

OTHER PUBLICATIONS

Office Action issued Aug. 14, 2025 in corresponding Chinese Patent Application No. 202180070971.1, with English language translation of the Search Report.

* cited by examiner

ELECTRIC OIL PUMP

TECHNICAL FIELD

The present invention relates to an electric oil pump.

BACKGROUND ART

In recent vehicles such as automobiles, an electric oil pump may be used to supply oil to each part of a vehicle. For example, in a vehicle or hybrid vehicle equipped with an idling stop mechanism (mechanism that automatically stops an engine when the vehicle is stopped), an electric oil pump may be attached to a transmission case in order to enable the retention of hydraulic pressure in a transmission while the vehicle is stopped. As this type of electric oil pump, for example, an electric oil pump disclosed in Patent Literature 1 below is known.

CITATIONS LIST

Patent Literatures

Patent Literature 1: JP 2015-105601 A
Patent Literature 2: JP 2017-184542 A
Patent Literature 3: JP 2020-195196 A

SUMMARY OF INVENTION

Technical Problems

However, in the electric oil pump described in Patent Literature 1, since a substrate on which a control circuit for controlling a motor is formed is disposed in a direction orthogonal to an output shaft, the thickness dimension of the electric oil pump in the orthogonal direction increases. Therefore, the installation space will be limited by this increase in dimension, and it is expected that it will be difficult to mount the electric oil pump. Furthermore, since a housing that houses a pump unit, a motor unit, and the substrate is divided at a plurality of places and these divided zones are screwed together to constitute the housing, the strength and rigidity of the housing remain a concern, resulting in insufficient reliability.

Therefore, an object of the present invention is to provide a compact and highly reliable electric oil pump.

Solutions to Problems

In order to address the above problems, the present invention provides an electric oil pump including: a pump unit that generates hydraulic pressure; a motor unit that drives the pump unit; a substrate on which a control circuit for controlling the motor unit is formed by a plurality of electronic components; and a housing equipped with a pump accommodation unit that houses the pump unit, a motor accommodation unit that houses the motor unit, and a substrate accommodation unit that houses the substrate. The substrate is disposed along a tangential direction of a circle about an axis of the motor unit, and the pump accommodation unit, the motor accommodation unit, and the substrate accommodation unit are integrally formed.

As described above, the substrate is disposed along the tangential direction of the circle about the axis of the motor unit, thereby allowing the electric oil pump to be downsized or thinned in the radial direction (particularly, the thickness direction of the substrate in the present invention) as compared with conventional products in which the substrate is disposed in a direction orthogonal to the axis. Furthermore, since the pump accommodation unit, the motor accommodation unit, and the substrate accommodation unit of the housing are integrally formed, it is possible to provide the housing having high strength and rigidity. Therefore, it is possible to provide a compact and highly reliable electric oil pump.

In this electric oil pump, it is preferable that the housing is equipped with a housing body that is configured by the pump accommodation unit, the motor accommodation unit, and the substrate accommodation unit being integrally formed, a suction hole and a discharge hole for oil are provided in a surface of the housing body, and a suction-side oil flow path connecting the suction hole and the pump unit and a discharge-side oil flow path connecting the discharge hole and the pump unit are provided in the housing body.

Thus, the housing body can be cooled by the oil flowing through the suction-side oil flow path and the discharge-side oil flow path. With this cooling effect, the cooling of the motor unit and the substrate, which are heat sources, can be promoted, and the reliability of the electric oil pump can be enhanced. Furthermore, the electric oil pump can be downsized as compared with a case where the suction-side oil flow path and the discharge-side oil flow path are provided in a member different from the housing body.

In this electric oil pump, at least one of the suction hole and the discharge hole is preferably disposed between the pump unit and the motor unit. Thus, the installation space for the oil flow path leading to the one side can be reliably secured without considering interference with the components housed in the housing.

Since the outer dimension of each of the bearing and seal disposed between the pump unit and the motor unit is smaller than the outer dimension of each of the pump unit and the motor unit, it is possible to secure installation space for the oil flow path by allowing the oil flow path leading to the other side to pass through the outer diameter side of the bearing and seal as described above, thereby avoiding an increase in size of the housing.

The housing body is preferably formed of a conductive metal material. Thus, the substrate is covered with the substrate accommodation unit that is a conductor. Therefore, the electromagnetic susceptibility (immunity) of the substrate can be reduced, and the reduction in the control accuracy of the motor unit due to the electromagnetic wave noise can be avoided, and the reliability of the electric oil pump can be enhanced.

Preferably, the pump unit and the motor unit are axially aligned, and the substrate is disposed so as to straddle the pump unit and the motor unit.

Thus, it is possible to secure a sufficient substrate length in the axial direction. Therefore, the protruding width of the substrate protruding in the tangential direction described above from the motor unit can be reduced, thereby allowing the electric oil pump to be downsized.

The outer peripheral surface of the pump accommodation unit and the outer peripheral surface of the motor accommodation unit are preferably provided on the bottom surface of the substrate accommodation unit, and the outer peripheral surface of the pump accommodation unit is preferably disposed closer to the axis of the motor unit than the outer peripheral surface of the motor accommodation unit.

Thus, the region radially facing the pump accommodation unit can be utilized as arrangement space for tall components among the electronic components on the substrate. In this case, short components can be intensively arranged in a region that radially faces the motor accommodation unit within the substrate. As a result, the substrate can be disposed close to the bottom surface of the substrate accommodation unit. Therefore, the electric oil pump can be downsized in the direction orthogonal to the substrate (in the thickness direction of the substrate).

In order to obtain this effect, the outer dimension of the pump unit is preferably smaller than the outer dimension of the motor unit.

The substrate is equipped with, as the electronic components, a tall component and a short component that is shorter than the tall component. The tall component is preferably disposed to face the outer peripheral surface of the pump accommodation unit.

The center of the substrate in the tangential direction described above is preferably offset in the tangential direction with respect to the axis of the motor unit. Thus, the distance to the outer peripheral surface of the motor accommodation unit can be further increased at one of the substrate ends in the tangential direction. Thus, it is possible to reliably secure installation space for the tall components at one end of the substrate in the tangential direction.

An opening is provided in the substrate accommodation unit. The electric oil pump also includes a closing unit that closes the opening of the substrate accommodation unit. In this case, a heat dissipation member is interposed between the substrate and the closing unit, thereby allowing heat from the high-temperature electronic components on the substrate to be efficiently released through the heat dissipation member to the closing unit and even to the housing body.

The closing unit is disposed in contact with outside air. Thus, since the heat radiation path includes the closing unit in contact with the outside air, it is possible to provide a cooling effect by outside air.

As an electric fluid pump mounted on a vehicle or the like, for example, in a vehicle equipped with an idling stop mechanism (mechanism that automatically stops an engine when the vehicle is stopped), an electric oil pump that maintains hydraulic pressure in a transmission while the vehicle is stopped is known.

This type of electric fluid pump is equipped with a substrate (control substrate) on which various electronic components such as capacitors are mounted in order to control fluid pressure. When an electric current flows through the electronic components on the substrate, the electronic components generate heat, and there is a possibility that the efficiency of circuit operation is reduced or the electronic components are damaged due to the influence of the heat generation.

Therefore, the Patent Literature 2 above and Patent Literature 3 below disclose a configuration equipped with a heat sink as a heat dissipation member that dissipates heat from the electronic components and the substrate. Since the heat from the electronic components on the substrate is dissipated through the heat sink, it is possible to avoid functional degradation or breakage of the electronic components due to temperature rise.

However, the above countermeasure of separately adding a heat dissipation member, such as a heat sink, has a problem that design change, such as component arrangement, is forced in addition to an increase in the number of components.

In order to provide an electric fluid pump capable of effectively dissipating heat from a substrate without newly adding a heat dissipation member, the present invention provides an electric fluid pump including: a pump unit that conveys fluid; a motor unit that drives the pump unit; a substrate on which a control circuit for controlling the motor unit is formed; and a housing equipped with a pump accommodation unit that houses the pump unit, a motor accommodation unit that houses the motor unit, and a substrate accommodation unit that houses the substrate. The pump accommodation unit, the motor accommodation unit, and the substrate accommodation unit are integral metal members.

As described above, in the present invention, the pump accommodation unit, the motor accommodation unit, and the substrate accommodation unit are integral metal members, so that heat conductivity in the housing is improved and heat of the substrate can be effectively dissipated through the housing. Furthermore, since it is not necessary to newly add a heat dissipation member, significant design changes can be avoided.

The substrate is preferably in contact with the housing with metal foil on the substrate interposed therebetween. In this case, since the heat conductivity from the substrate to the housing is improved, the heat dissipation of the substrate is improved.

Furthermore, the substrate is preferably fixed to the housing by a metal fixture. In this case, since the heat conductivity from the substrate to the housing is also improved, the heat dissipation of the substrate is improved.

Furthermore, the substrate and the housing are preferably in contact with each other on the surface of the substrate on the pump accommodation unit side. Thus, since the heat transfer path from the substrate to the pump accommodation unit is shortened, the heat from the substrate is easily transferred to the fluid in the pump accommodation unit, and the heat dissipation of the substrate is further improved.

Furthermore, in a case where the housing has a plurality of substrate mounting portions to which the substrate is mounted, some of the plurality of substrate mounting portions are preferably arranged further toward the pump accommodation unit side than the other substrate mounting portions. In this case, in particular, the heat transfer path through the substrate mounting portion on the pump accommodation unit side is shortened, so that the heat from the substrate is easily transferred to the pump accommodation unit.

Furthermore, the substrate is preferably disposed along the tangential direction of a circle about the axis of the motor unit. In this case, the electric fluid pump can be downsized (thinned) in the direction orthogonal to the substrate, and the heat transfer path from the substrate to the pump accommodation unit is shortened, so that the heat from the substrate is easily transferred to the pump accommodation unit.

The above configuration allow effective heat dissipation of the substrate without newly adding a heat dissipation member.

Advantageous Effects of Invention

As described above, according to the present invention, it is possible to provide a compact and highly reliable electric oil pump.

DESCRIPTION OF EMBODIMENTS

Hereinafter, an embodiment of the present invention will be described with reference to FIGS. 1 to 7.

An electric oil pump according the present embodiment supplies hydraulic pressure to a transmission while the engine is stopped. Oil is sucked from an oil reservoir at the bottom of a transmission case and the oil is discharged and pumped into the transmission to ensure necessary hydraulic pressure in the transmission.

Figure 1:
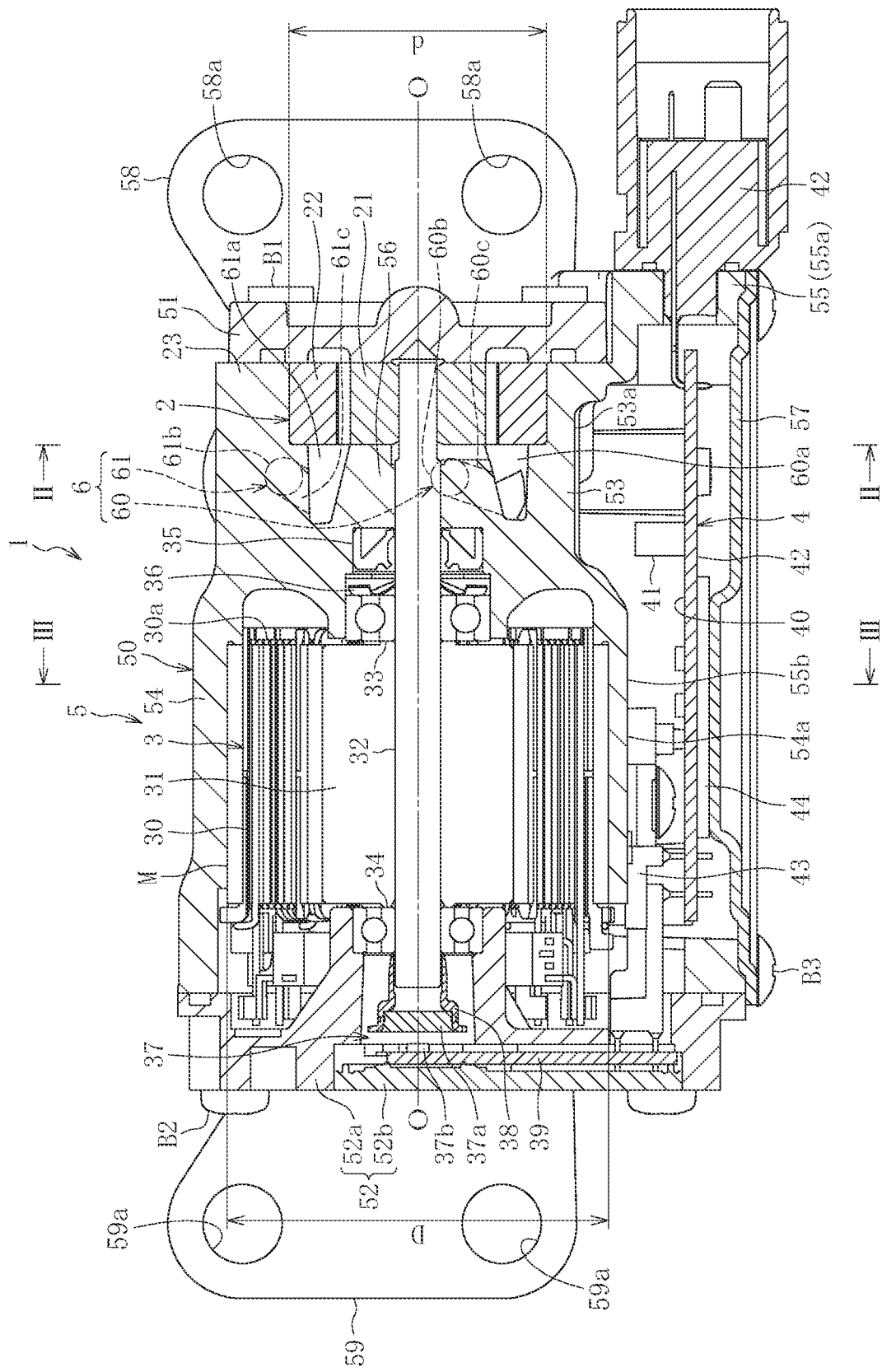
FIG. 1 is an axial sectional view of an electric oil pump according to the present embodiment.
Figure 2:
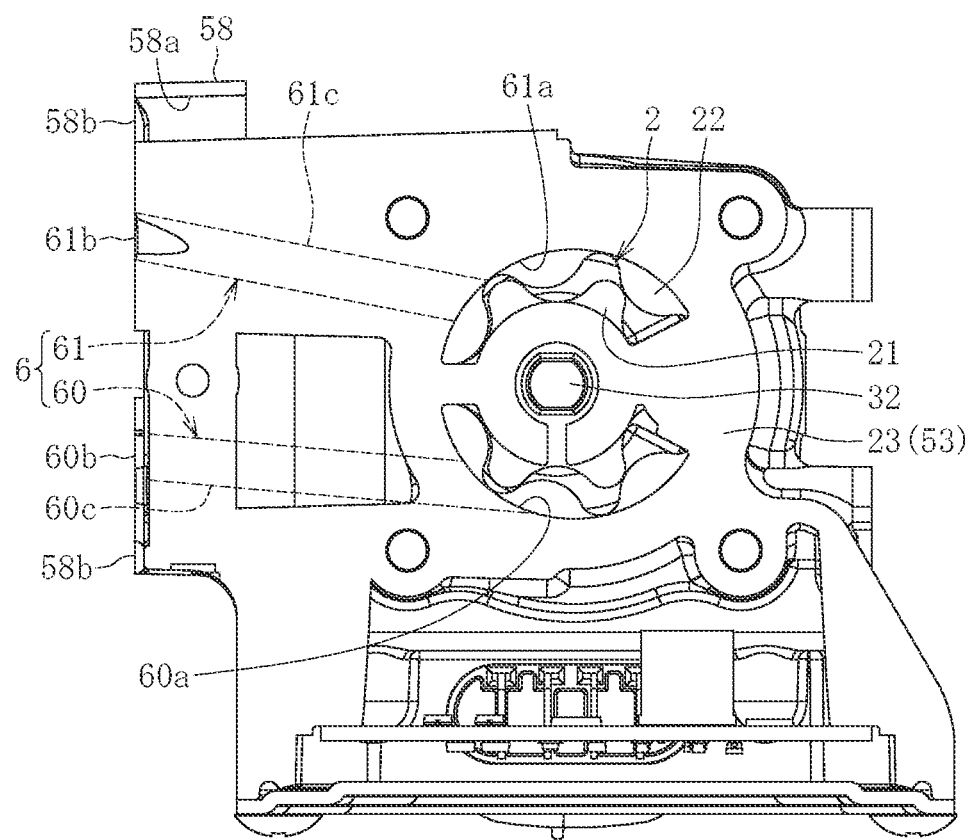
FIG. 2 is a cross-sectional view taken along II-II in FIG. 1.
Figure 3:
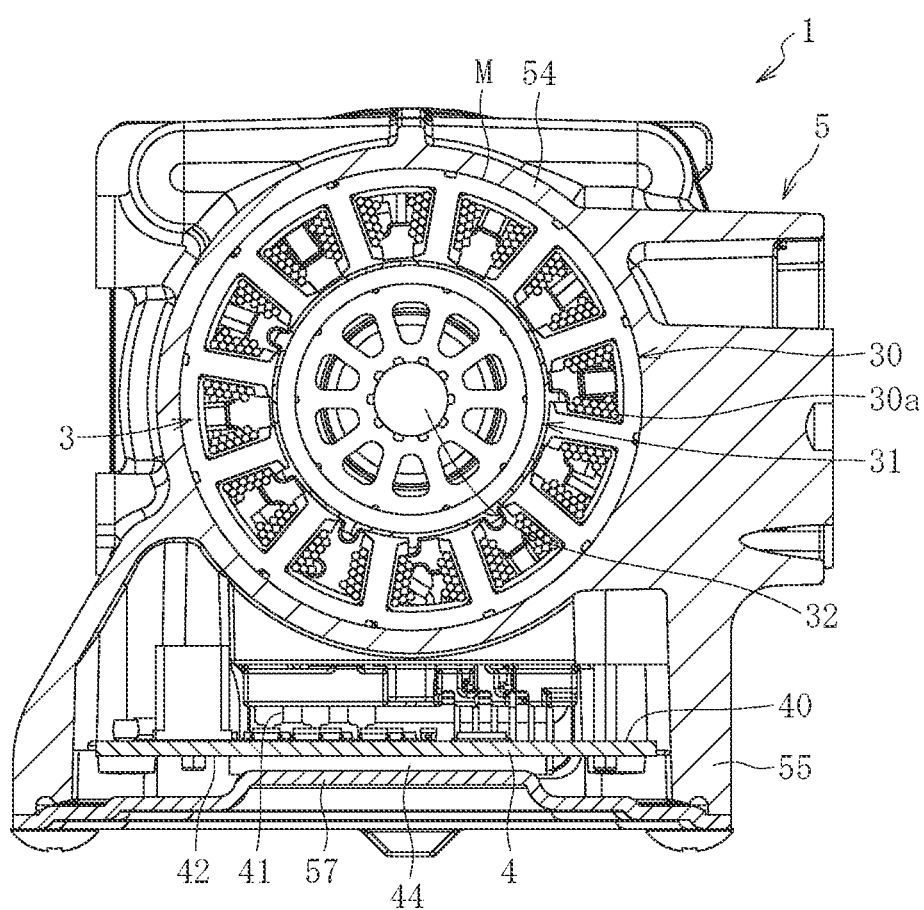
FIG. 3 is a cross-sectional view taken along in FIG. 1.

As illustrated in FIGS. 1 to 3, the electric oil pump 1 according to the present embodiment has a pump unit 2 that generates hydraulic pressure, a motor unit 3 that drives the pump unit 2, a substrate 4, and a housing 5 that houses the pump unit 2, the motor unit 3, and the substrate 4. Hereinafter, each member or element will be described in detail.

Note that, in the following description, the direction parallel to the axis O of the motor unit 3 is referred to as the "axial direction", and the radial direction of a circle about the axis O is referred to as the "radial direction" (the "inner diameter direction" and "outer diameter direction" also mean the inner diameter direction and outer diameter direction of the circle). Furthermore, the circumferential direction of the circle about the axis O is referred to as the "circumferential direction".

As illustrated in FIGS. 1 and 2, the pump unit 2 according to the present embodiment is a trochoid pump having an inner rotor 21 with a plurality of external teeth formed thereon, an outer rotor 22 with a plurality of internal teeth formed thereon, and a pump case 23 serving as a stationary member that houses the inner rotor 21 and the outer rotor 22. The inner rotor 21 is disposed on the inner diameter side of the outer rotor 22. The outer rotor 22 is in an eccentric position relative to the inner rotor 21. Some of the teeth of the outer rotor 22 are in mesh with some of the teeth of the inner rotor 21. Note that, when the number of teeth of the inner rotor 21 is n, the number of teeth of the outer rotor 22 is (n+1).

Both the outer peripheral surface of the outer rotor 22 and the inner peripheral surface of the pump case 23 are cylindrical surfaces that can be fitted to each other. The outer rotor 22 is rotatably disposed on the inner periphery of the pump case 23 so as to rotate in accordance with the rotation of the inner rotor 21.

As illustrated in FIG. 1, the motor unit 3 is arranged side by side with the pump unit 2 in the axial direction. As the motor unit 3, for example, a three-phase brushless DC motor is used. As illustrated in FIGS. 1 and 3, the motor unit 3 has a stator 30 having a plurality of coils 30a, a rotor 31 disposed inside the stator 30 leaving a gap therebetween, and an output shaft 32 coupled to the rotor 31. The stator 30 is formed with the coils 30a corresponding to three phases of U-phase, V-phase, and W-phase.

The output shaft 32 protrudes from both sides of the stator 30 in the axial direction. The portions of the output shaft 32 which protrude from the stator 30 on both sides in the axial direction are supported so as to be rotatable with respect to the housing 5 via bearings (for example, rolling bearings such as deep groove ball bearings) 33 and 34.

The inner rotor 21 of the pump unit 2 is attached to the end of the output shaft 32 on the pump unit 2 side. A speed reducer is not disposed between the output shaft 32 and the pump unit 2, and the inner rotor 21 is directly connected to the output shaft 32 of the motor unit 3. A seal 35 equipped with a seal lip that is in sliding contact with the outer peripheral surface of the output shaft 32 is disposed between the bearing 33 located on the pump unit 2 side in the axial direction and the inner rotor 21. The seal 35 prevents oil leakage from the pump unit 2 to the motor unit 3. An elastic member 36 compressed in the axial direction is disposed between the bearing 33 on the pump unit 2 side in the axial direction and the seal 35.

In order to detect the rotational angle of the rotor 32 of the motor unit 3, a detection unit 37 is provided between the rotation side and stationary side of the motor unit 3. As illustrated in FIG. 1, the detection unit 37 according to the present embodiment can be configured from a sensor magnet 37a (for example, a neodymium bonded magnet) mounted to the shaft end of the output shaft 32 on the anti-pump unit side via a bracket 38, and a magnetic sensor 37b, such as an MR element, provided to the housing 5 on the stationary side. The magnetic sensor 37b is mounted to a sub-substrate 39 that is disposed so as to face the shaft end of the output shaft 32 on the anti-pump side, and that is disposed in a direction orthogonal to the output shaft 32. The detection value of the magnetic sensor 37b is input to the control circuit on the substrate 4 (main substrate) described later.

Note that a Hall element can also be used as the magnetic sensor 37b. In addition to the magnetic sensor, an optical encoder, a resolver, or the like can also be used as the detection unit 37. Note that the motor unit 3 can also be driven without a sensor.

Figure 4:
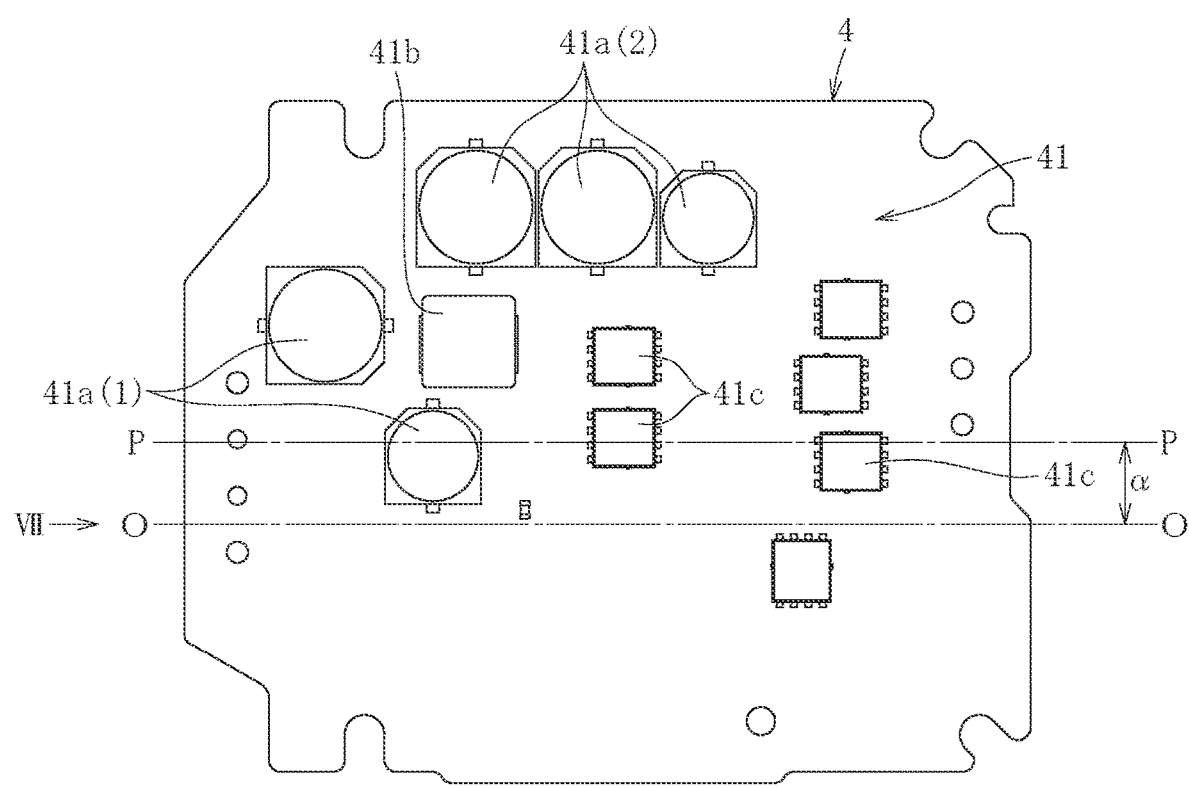
FIG. 4 is a plan view of a substrate as viewed from the mounting surface side.

As illustrated in FIG. 4, the substrate 4 is formed in a rectangular shape in plan view. As illustrated in FIGS. 1 and 3, the substrate 4 is disposed parallel to the output shaft 32 of the motor unit 3, and a mounting surface 40 of the substrate 4 extends in the tangential direction of a circle about the axis O of the motor unit 3. Both ends of the substrate 4 in the tangential direction are located at positions protruding in the tangential direction from the outer peripheral contour M (outer peripheral contour of the stator) of the motor unit 3.

A plurality of electronic components 41 are mounted on one surface of the substrate 4. As illustrated in FIG. 4, examples of the electronic components include capacitors (electrolytic capacitors such as aluminum electrolytic capacitors) 41a, inductors 41b, and semiconductor elements 41c such as MOS-FETs. In addition, integrated circuits, such as driver ICs, and resistors, are used. The electronic components 41 constitute a control circuit that controls the drive of the motor unit 3. Among the electronic components 41, the capacitors 41a and the inductors 41b are tall electronic components (referred to as tall components), and the semiconductor elements 41c, the integrated circuits, and the resistors are short electronic components (referred to as short components). As illustrated in FIG. 2, the substrate 4 is disposed such that the surface (mounting surface) 40 on which the electronic components 41 are mounted faces the pump unit 2 and the motor unit 3.

The substrate 4 is supplied with power from an external power supply through a connector 42. The polarity of the drive current is controlled in the control circuit on the substrate 4. As illustrated in FIG. 1, the controlled current is supplied to each of the coils 30a in the stator 30 of the motor unit 3 through a bus bar 43 that is connected to the substrate 4. A heat dissipation sheet 44 serving as a heat dissipation member is mounted to a surface 42 of the substrate 4 on the opposite side from the mounting surface 40. The heat dissipation sheet 44 is formed of a highly thermally conductive and compressible material. The heat dissipation sheet 44 is disposed so as to be in contact with high-heat generating components (for example, the semiconductor elements 41c) among the electronic components.

The housing 5 has a cylindrical housing body 50 with openings at both ends, a first lid 51 that closes the opening of the housing body 50 on the pump side in the axial direction, and a second lid 52 that closes the opening of the housing body 50 on the anti-pump side in the axial direction. The first lid 51 and the second lid 52 are fixed to the housing body 50 using a plurality of fastening bolts B1 and B2, respectively.

The second lid 52 has a cylindrical bearing case 52a that supports the bearing 34 on the anti-pump unit side, and a cover 52b that closes the opening of the bearing case 52a on the anti-pump unit side. The sub-substrate 39 is disposed on the inner diameter side of the bearing case 52a. The cover 52b is mounted to the bearing case 52a using a fastening member (not illustrated).

The housing body 50 has a pump accommodation unit 53 that houses the pump unit 2, a motor accommodation unit 54 that houses the motor unit 3, and a substrate accommodation unit 55 that houses the substrate 4, which are integrally formed as a single component. The housing body 50, the first lid 51, and the second lid 52 are formed of a metal material that is a conductor and has good thermal conductivity, for example, an aluminum alloy.

The pump accommodation unit 53 of the housing 5 has a substantially cylindrical shape including the pump case 23 of the pump unit 2. A partition wall 56 that partitions the interior of the housing into the pump unit 2 side and the motor unit 3 side is provided on the inner peripheral surface of the pump accommodation unit 53. The inner peripheral surface of the partition wall 56 extends to a position close to the outer peripheral surface of the output shaft 32. The inner peripheral surface of the partition wall 56 and the outer peripheral surface of the output shaft 32 are in a non-contact state, thereby allowing the rotation of the output shaft 32.

The motor accommodation unit 54 is formed in a cylindrical shape. The stator 30 of the motor unit 3 is press-fitted or adhesively fixed to the cylindrical inner peripheral surface (see FIG. 3) of the motor accommodation unit 54. The bearing 33 on the pump unit 2 side and the seal 35 as described above are attached to the inner peripheral surface of the motor accommodation unit 54 further toward the pump unit 2 side in the axial direction than the motor unit 3. The bearing 33 and the seal 35 are located further toward the anti-pump unit side in the axial direction than the partition wall 56.

Figure 5:
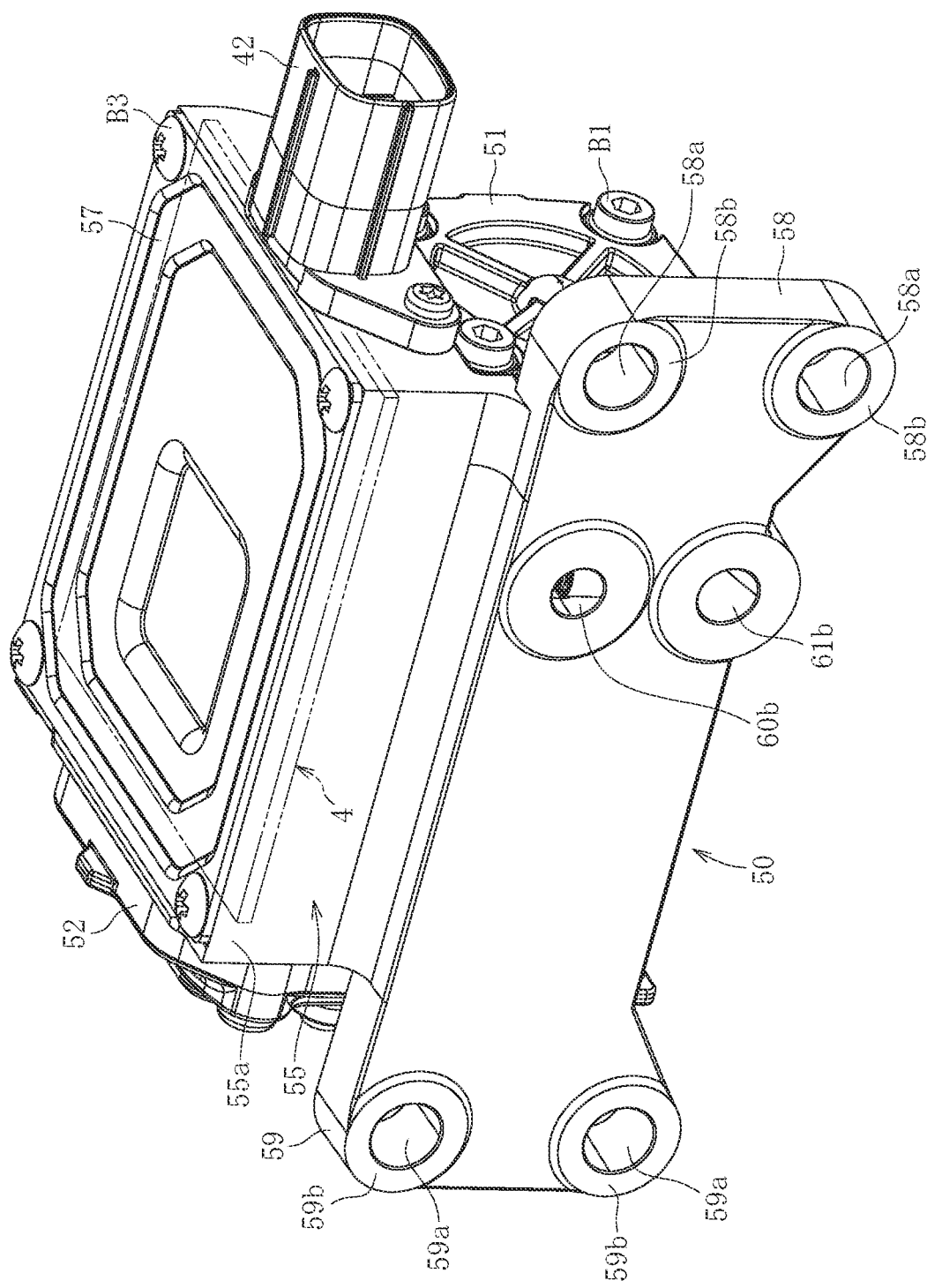
FIG. 5 is a perspective view of the electric oil pump according to the present embodiment.

FIG. 5 is a perspective view of the electric oil pump 1 illustrated in FIG. 1 when viewed upside down from the pump unit 2 side and the substrate accommodation unit 55 side. As illustrated in FIG. 5, the substrate accommodation unit 55 of the housing 5 has a rectangular frame shape when viewed from the radial direction, and has a peripheral wall 55a having an opening on the outer diameter side in the radial direction. The periphery of the substrate 4 disposed in the substrate accommodation unit 55 is surrounded by the peripheral wall 55a. After the substrate 4 is disposed in the substrate accommodation unit 55, the opening of the substrate accommodation unit 55 is closed by a cover 57 serving as a closing unit. The cover 57 is mounted to the housing body 50 using a fastening member B3. The fastening member refers to all bolts including tapping screws. In this state, the cover 57 is in contact with the heat dissipation sheet 44 illustrated in FIG. 1. Thus, heat from the high-temperature electronic components 41 on the substrate 4 can be efficiently released to the cover 57 and even to the housing body 50 through the heat dissipation sheet 44. At this time, since the heat path includes the cover 57 in contact with the outside air, a cooling effect by the outside air can also be expected.

As illustrated in FIG. 1, the bottom surface 55b of the substrate accommodation unit 55 is formed by the outer peripheral surface of the pump accommodation unit 53 and the outer peripheral surface of the motor accommodation unit 54. On the bottom surface 55b, there is a step in the radial direction between the outer peripheral surface of the pump accommodation unit 53 and the outer peripheral surface of the motor accommodation unit 54, and the outer peripheral surface of the pump accommodation unit 53 is located closer to the axis O of the motor unit 3 in the radial direction than the outer peripheral surface of the motor accommodation unit 54.

As illustrated in FIGS. 1 and 5, flange-shaped mounting portions 58 and 59 for mounting the electric oil pump 1 to a mounting object (transmission case in the present embodiment) to which the electric oil pump 1 is to be mounted are integrally formed on both axial sides of the housing body 50. Two fastening holes 58a are formed in the mounting portion 58 on the pump unit 3 side, and two fastening holes 59a are formed in the mounting portion 59 on the anti-pump unit side. The electric oil pump 1 is mounted to the mounting object by inserting fastening members (not illustrated) into the fastening holes 58a and 59a and screwing the fastening members into the mounting object.

Flat mounting surfaces 58b and 59b that are brought into contact with the mounting object are formed around the fastening holes 58a and 59a of the mounting portions 58 and 59. The mounting surfaces 58b and 59b are arranged on a common plane that extends in a direction orthogonal to the substrate 4 housed in the substrate accommodation unit 55.

As illustrated in FIG. 1, an oil flow path 6 that is connected to the pump unit 2 is provided in the housing body 50. As the oil flow path 6, a suction-side oil flow path 60 and a discharge-side oil flow path 61 are provided separately from each other.

As illustrated in FIG. 2, the suction-side oil flow path 60 has a suction-side space 60a that opens into the meshing portion between the inner rotor 21 and the outer rotor 22, a suction hole 60b that opens into the surface of the housing body 50, and a suction-side communication path 60c that provides communication between the suction-side space 60a and the suction hole 60b. Similarly, the discharge-side oil flow path 61 has a discharge-side space 61a that opens into the meshing portion between the inner rotor 21 and the outer rotor 22, a discharge hole 61b that opens into the surface of the housing body 50, and a discharge-side communication path 61c that provides communication between the discharge-side space 61a and the discharge hole 61b.

Both the suction-side space 60a and the discharge-side space 61a are provided in the region of the pump unit 3 on the anti-pump unit side in the axial direction within the pump accommodation unit 53. The suction-side space 60a and the discharge-side space 61a both have an arc shape extending in the circumferential direction of the output shaft 32, and are provided at positions facing each other at 180° in the circumferential direction. In the present embodiment, the suction-side space 60a is disposed closer to the substrate 4 than the discharge-side space 61a. Furthermore, as illustrated in FIG. 5, the suction hole 60b and the discharge hole 61b open into the surface of the housing 5 facing the mounting object. The suction hole 60b and the discharge hole 61b are located on a plane containing the mounting surfaces 58b and 59b of the mounting portions 58 and 59. Thus, there is no need to route piping for oil around the electric oil pump 1, and the peripheral structure of the electric oil pump 1 can be simplified.

In the electric oil pump having the above configuration, the inner rotor 21 rotates when the motor unit 3 is driven. As the inner rotor 21 rotates, the outer rotor 22, which is in mesh with the inner rotor 21, is rotated in accordance with the rotation of the inner rotor 21, and the clearances formed between the teeth of the two rotors increase and decrease with the rotation. Therefore, the oil accumulated in the oil reservoir in the transmission case is sucked into the pump unit 2 through the suction-side oil flow path 60, and the sucked oil is discharged into the transmission through the discharge-side oil flow path 61.

The electric oil pump 1 according to the present embodiment having the above configuration has the following features.

Since the substrate 4 is disposed along the tangential direction of the circle about the axis O of the motor unit 3, the electric oil pump can be downsized (thinned) in the radial direction (the thickness direction of the substrate 4 in the present embodiment) as compared with conventional products in which the substrate is disposed in a direction orthogonal to the axis. Furthermore, since no substrate oriented orthogonally to the axial direction is disposed at one end of the output shaft 32 in the axial direction, tall electronic components mounted on such substrate do not increase the axial dimension of the electric oil pump, and the axial dimension of the electric oil pump 1 can be reduced. Furthermore, since the pump accommodation unit 53, the motor accommodation unit 54, and the substrate accommodation unit 55 of the housing 5 are integrally formed, it is possible to provide the housing 5 having high strength and rigidity. Therefore, it is possible to provide the compact and highly reliable electric oil pump 1.

Note that the reliability of the electric oil pump 1 can be further enhanced by directly mounting the pump unit 2, the motor unit 3, and the substrate 4 to the highly rigid housing 5 without interposing a cushioning material such as a resin material.

Furthermore, the suction hole 60b and discharge hole 61b for oil are provided in the surface of the housing body 50. In addition, the suction-side oil flow path 60 connecting the suction hole 60b and the pump unit 2 and the discharge-side oil flow path 61 connecting the discharge hole 61b and the pump unit 2 are both provided in the housing body 50. Therefore, the housing body 50 can be cooled by the oil flowing through the suction-side oil flow path 60 and the discharge-side oil flow path 61. With this cooling effect, the cooling of the motor unit 3 and the substrate 4, which are heat sources, can be promoted, and the reliability of the electric oil pump 1 can be enhanced. Furthermore, the electric oil pump 1 can be downsized as compared with a case where the suction-side oil flow path 60 and the discharge-side oil flow path 61 are provided in a member different from the housing body 50.

In the present embodiment, the suction hole 60b and the discharge hole 61b are arranged between the pump unit 2 and the motor unit 3. Specifically, as illustrated in FIG. 1, the suction hole 60b and discharge hole 61b are arranged between the pump unit 2 and the seal 35. Therefore, the installation space for the suction-side communication path 60c leading to the suction hole 60b and the discharge-side communication path 61c leading to the discharge hole 61b can be secured without interfering with the components housed in the housing 5.

Note that, without changing the configurations of the suction-side oil flow path 60 and the discharge-side oil flow path 61, the suction-side oil flow path 60 can also be used as a discharge-side oil flow path and the discharge-side oil flow path 61 can also be used as a suction-side oil flow path. Furthermore, both the suction hole 60b and the discharge hole 61b may be disposed between the pump unit 2 and the motor unit 3, or either one may be disposed in a region other than this region (for example, in the outer diameter region of the motor unit 3).

Furthermore, since the housing body 50 is formed of a conductive metal material, the substrate 4 is covered with the substrate accommodation unit 55 that is a conductor. Therefore, the electromagnetic susceptibility (immunity) of the substrate 4 can be reduced, and the reduction in the control accuracy of the motor unit 3 due to the electromagnetic wave noise can be avoided, and the reliability of the electric oil pump 1 can be enhanced. In order to obtain this effect, it is preferable that the cover 57 for closing the substrate accommodation unit 55 is also formed of a conductive metal material (such as an aluminum alloy). By forming the housing body 50, and even the cover 57 from a metal material, it is also possible to provide the advantage of improved heat dissipation effect due to the good thermal conductivity.

Furthermore, in the present embodiment, since the substrate 4 is disposed so as to straddle the pump accommodation unit 53 and motor accommodation unit 54 that are axially aligned, it is possible to secure a sufficient substrate length in the axial direction. Therefore, the protruding width of the substrate 4 protruding in the tangential direction from the motor unit 3 can be reduced, thereby allowing the electric oil pump 1 to be downsized.

Figure 6:
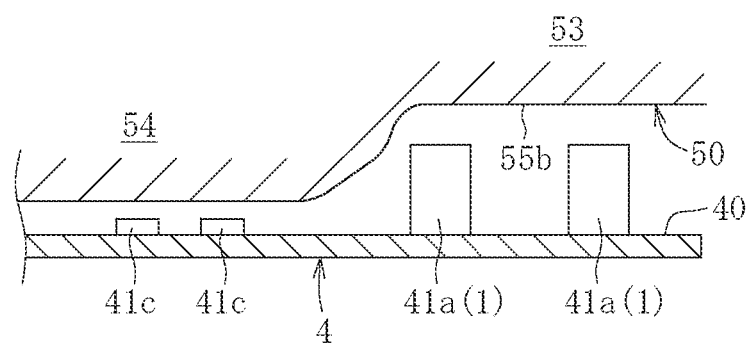
FIG. 6 is a partially-enlarged sectional view of FIG. 1.

Further, the outer peripheral surface of the pump accommodation unit 53 and the outer peripheral surface of the motor accommodation unit 54 are provided on the bottom surface 55b of the substrate accommodation unit 55, and the outer peripheral surface of the pump accommodation unit 53 is disposed closer to the axis O of the motor unit 3 than the outer peripheral surface of the motor accommodation unit 54. Thus, as shown in FIG. 6, the region radially facing the pump accommodation unit 53 can be utilized as arrangement space for tall components (for example, the electrolytic capacitors 41a or the inductors 41b) among the electronic components 41 on the substrate 4. In this case, short components (for example, semiconductor elements 41c, integrated circuits, or resistors) are intensively arranged in a region that radially faces the motor accommodation unit 54 within the substrate 4.

Thus, the substrate 4 can be disposed close to the bottom surface 55b of the substrate accommodation unit 55. Therefore, the electric oil pump 1 can be downsized (thinned) in the direction orthogonal to the substrate 4. In order to obtain this effect, as shown in FIG. 1, the outer dimension d of the pump unit 2 is preferably smaller than the outer dimension D of the motor unit 3 (d<D). This means that a low-capacity type is used as the pump unit, while a high-speed rotation type is used as the motor unit 3. By rotating the low-capacity pump unit 2 at a high speed, a necessary pump capacity can be secured.

Figure 7:
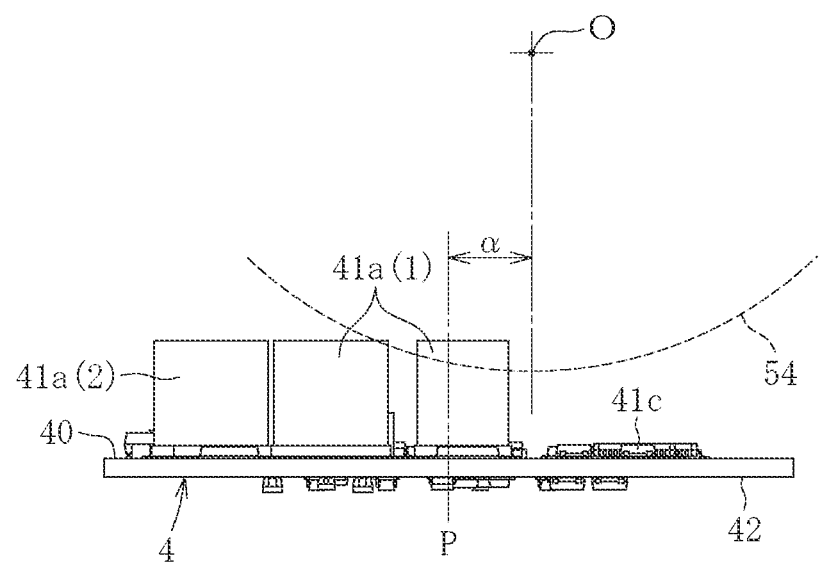
FIG. 7 is a side view of the substrate as viewed from direction VII in FIG. 4.

Note that, as described above, the substrate 4 is disposed along the tangential direction of the circle about the axis O of the motor unit 3. Furthermore, in the tangential direction, both ends of the substrate 4 extend to the region on both sides sandwiching the axis O of the motor unit. Therefore, as illustrated in FIG. 7, at the end of the substrate 4 in the tangential direction, the distance from the cylindrical outer peripheral surface of the motor accommodation unit 54 is greater than at the center. Therefore, both ends of the substrate 4 in the tangential direction can be used as arrangement space for the tall components (electrolytic capacitors 41a or inductors 41b).

In particular, in the present embodiment, as illustrated in FIGS. 4 and 7, the center P of the substrate 4 in the tangential direction is offset in the tangential direction with respect to the axis O of the motor unit 3 (offset width α). Therefore, the distance to the outer peripheral surface of the motor accommodation unit 54 can be further increased at one of the substrate ends in the tangential direction. Thus, it is possible to reliably secure installation space for the tall components 41a and 41b at one end of the substrate 4 in the tangential direction.

FIG. 4 illustrates an example of an electronic component arrangement designed on the basis of the above verification results. In FIG. 4, some electrolytic capacitors 41a (1) and the inductor 41b among the tall components are arranged at a position facing the outer peripheral surface of the pump accommodation unit 53, and the remaining electrolytic capacitors 41a (2) are arranged at one end of the substrate 4 in the tangential direction. Thus, even if the substrate 4 is disposed close to the outer peripheral surface of the motor accommodation unit 54, all tall components (electrolytic capacitors and inductors) required for the control circuit can be arranged in a region having a sufficient width with respect to the bottom surface 55b of the substrate accommodation unit 55. Thus, it is possible to downsize the electric oil pump 1 in the thickness direction of the substrate 4.

In the above description, the case where the electronic components 41 are mounted only on the surface (mounting surface) 40 that faces the outer peripheral surface of the pump accommodation unit 53 and the outer peripheral surface of the motor accommodation unit 54 within the surface of the substrate 4 has been exemplified, but the short components 41c can be attached not only to the surface 40 but also to the surface 42 (see FIG. 7) of the substrate 4 on the opposite side. In this case, the short components 41c are arranged so as to avoid the heat dissipation sheet 44.

Hereinafter, another embodiment of the present invention will be described with reference to FIGS. 8 to 15.

An electric oil pump according the present embodiment supplies hydraulic pressure to a transmission while the engine is stopped. Oil is sucked from an oil reservoir at the bottom of a transmission case and the oil is discharged and pumped into the transmission to ensure necessary hydraulic pressure in the transmission.

Figure 8:
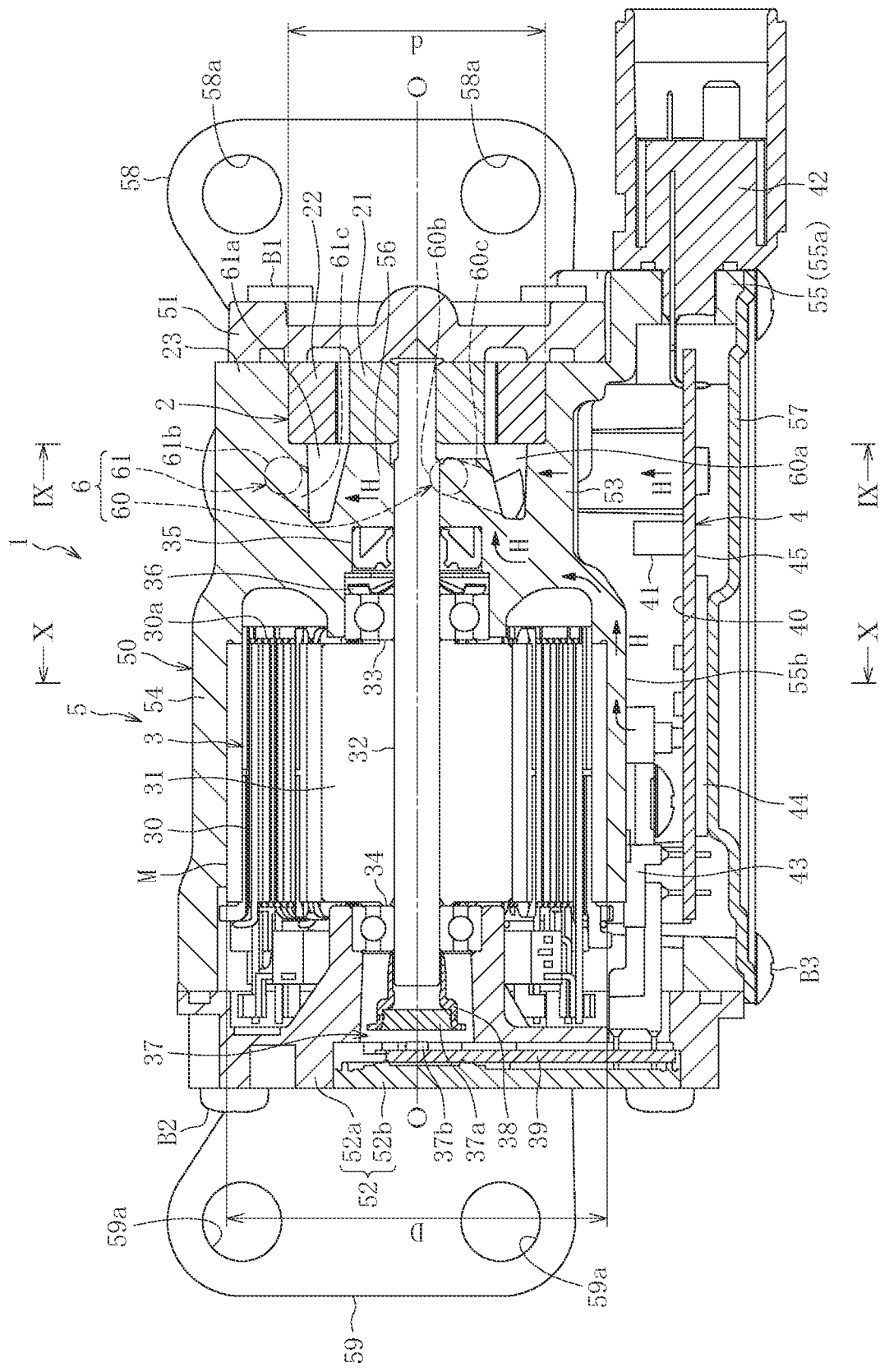
FIG. 8 is an axial sectional view of an electric oil pump according to another embodiment of the present invention.
Figure 9:
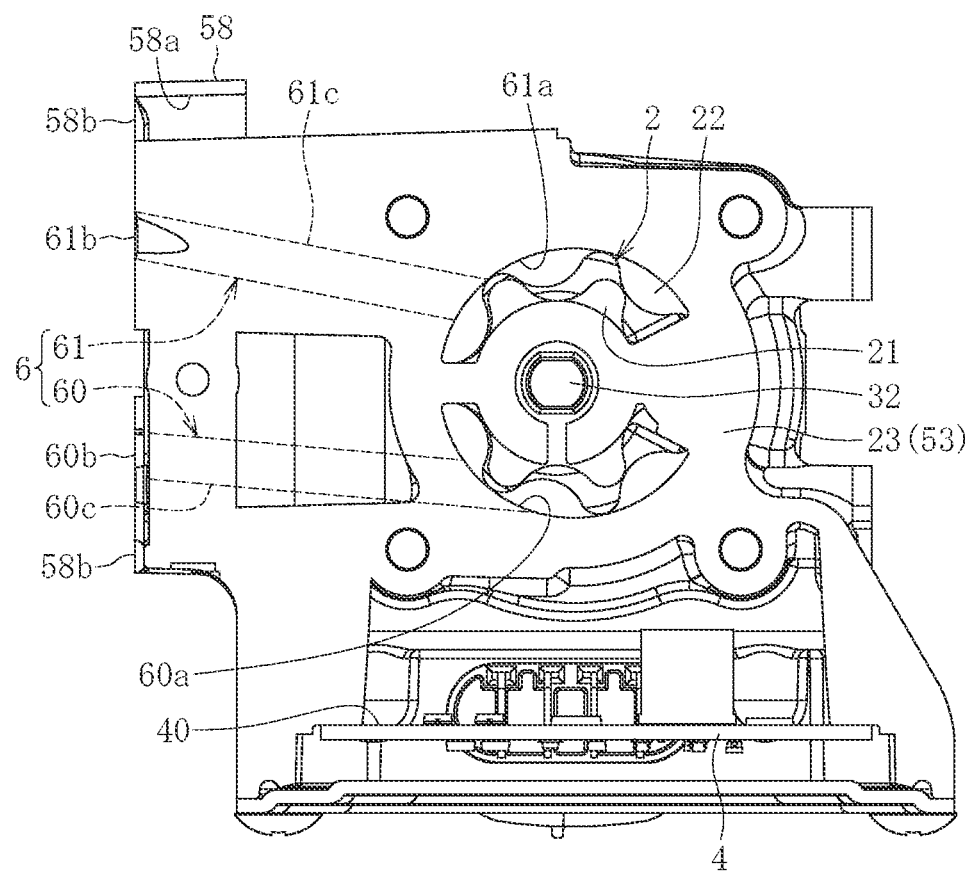
FIG. 9 is a cross-sectional view taken along IX-IX in FIG. 8.
Figure 10:
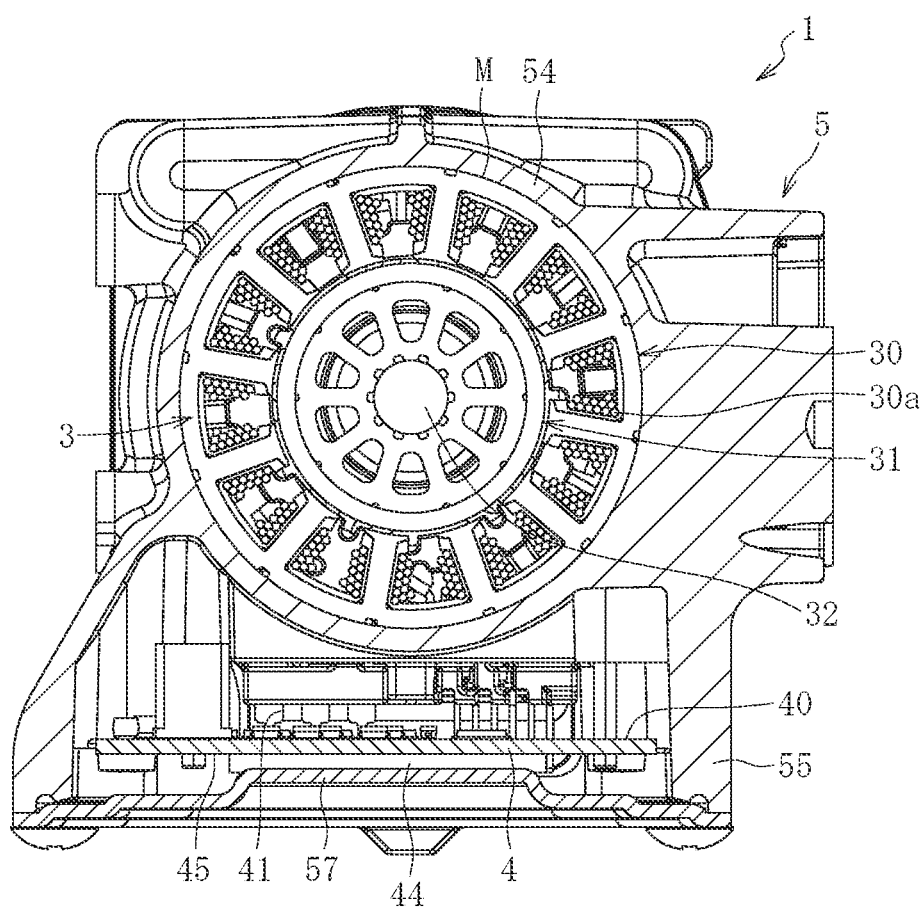
FIG. 10 is a cross-sectional view taken along X-X in FIG. 8.

As illustrated in FIGS. 8 to 10, the electric oil pump 1 according to the present embodiment has the pump unit 2 that generates hydraulic pressure, the motor unit 3 that drives the pump unit 2, the substrate 4, and the housing 5 that houses the pump unit 2, the motor unit 3, and the substrate 4. Hereinafter, each member or element will be described in detail.

Note that, in the following description, the direction parallel to the axis O of the motor unit 3 is referred to as the "axial direction", and the radial direction of a circle about the axis O is referred to as the "radial direction" (the "inner diameter direction" and "outer diameter direction" also mean the inner diameter direction and outer diameter direction of the circle). Furthermore, the circumferential direction of the circle about the axis O is referred to as the "circumferential direction".

As illustrated in FIGS. 1 and 2, the pump unit 2 according to the present embodiment is a trochoid pump having the inner rotor 21 with a plurality of external teeth formed thereon, the outer rotor 22 with a plurality of internal teeth formed thereon, and the pump case 23 serving as a stationary member that houses the inner rotor 21 and the outer rotor 22. The inner rotor 21 is disposed on the inner diameter side of the outer rotor 22. The outer rotor 22 is in an eccentric position relative to the inner rotor 21. Some of the teeth of the outer rotor 22 are in mesh with some of the teeth of the inner rotor 21. Note that, when the number of teeth of the inner rotor 21 is n, the number of teeth of the outer rotor 22 is (n+1).

Both the outer peripheral surface of the outer rotor 22 and the inner peripheral surface of the pump case 23 are cylindrical surfaces that can be fitted to each other. The outer rotor 22 is rotatably disposed on the inner periphery of the pump case 23 so as to rotate in accordance with the rotation of the inner rotor 21.

As illustrated in FIG. 8, the motor unit 3 is arranged side by side with the pump unit 2 in the axial direction. As the motor unit 3, for example, a three-phase brushless DC motor is used. As illustrated in FIGS. 8 and 10, the motor unit 3 has the stator 30 having the plurality of coils 30a, the rotor 31 disposed inside the stator 30 leaving a gap therebetween, and the output shaft 32 coupled to the rotor 31. The stator 30 is formed with the coils 30a corresponding to three phases of U-phase, V-phase, and W-phase.

The output shaft 32 protrudes from both sides of the stator 30 in the axial direction. The portions of the output shaft 32 which protrude from the stator 30 on both sides in the axial direction are supported so as to be rotatable with respect to the housing 5 via bearings (for example, rolling bearings such as deep groove ball bearings) 33 and 34.

The inner rotor 21 of the pump unit 2 is attached to the end of the output shaft 32 on the pump unit 2 side. A speed reducer is not disposed between the output shaft 32 and the pump unit 2, and the inner rotor 21 is directly connected to the output shaft 32 of the motor unit 3. A seal 35 equipped with a seal lip that is in sliding contact with the outer peripheral surface of the output shaft 32 is disposed between the bearing 33 located on the pump unit 2 side in the axial direction and the inner rotor 21. The seal 35 prevents oil leakage from the pump unit 2 to the motor unit 3. An elastic member 36 compressed in the axial direction is disposed between the bearing 33 on the pump unit 2 side in the axial direction and the seal 35.

In order to detect the rotational angle of the rotor 31 of the motor unit 3, the rotational angle detection unit 37 is provided between the rotation side and stationary side of the motor unit 3. As illustrated in FIG. 8, the rotational angle detection unit 37 according to the present embodiment can be configured from the sensor magnet 37a (for example, a neodymium bonded magnet) mounted to the shaft end of the output shaft 32 on the anti-pump unit side via the bracket 38, and the magnetic sensor 37b, such as an MR element, provided to the housing 5 on the stationary side. The magnetic sensor 37b is mounted to a sub-substrate 39 that is disposed so as to face the shaft end of the output shaft 32 on the anti-pump side, and that is disposed in a direction orthogonal to the output shaft 32. The detection value of the magnetic sensor 37b is input to the control circuit on the substrate 4 (main substrate) described later.

Note that a Hall element can also be used as the magnetic sensor 37b. In addition to the magnetic sensor, an optical encoder, a resolver, or the like can also be used as the rotational angle detection unit 37. Note that the motor unit 3 can also be driven without a sensor.

Figure 11:
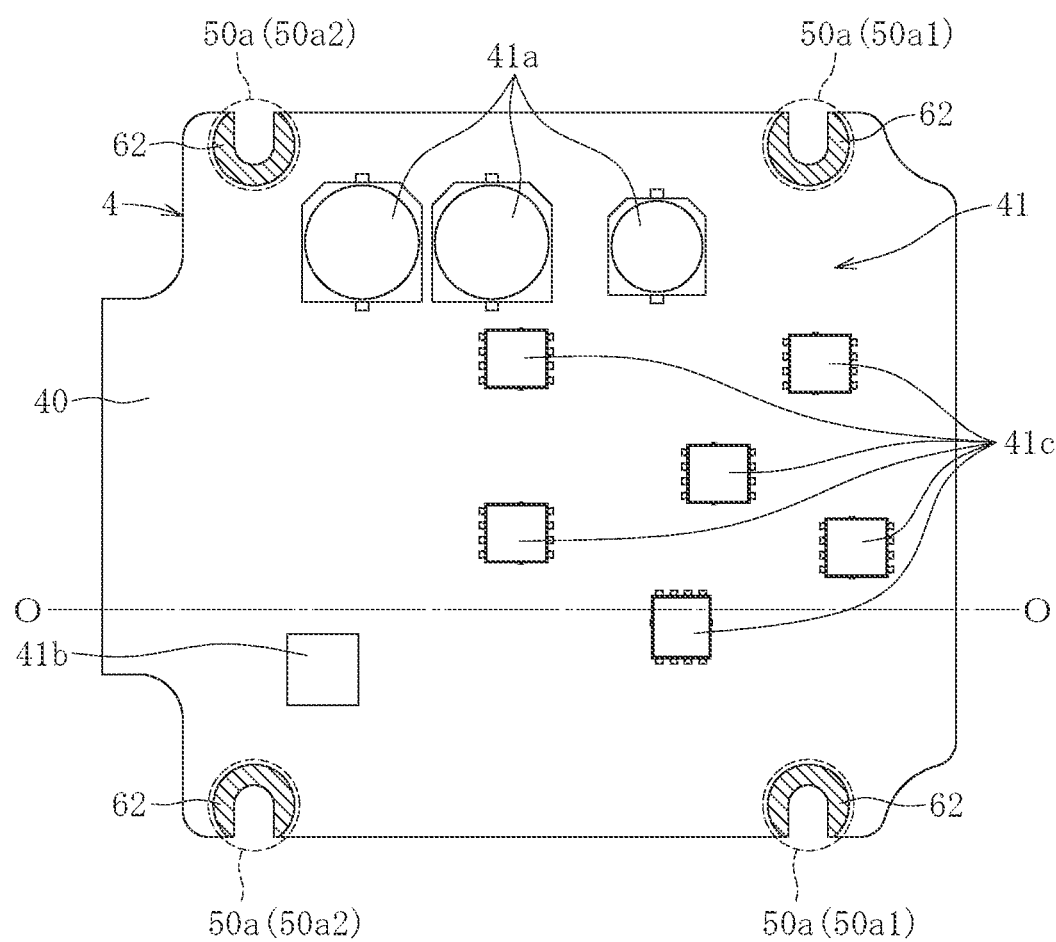
FIG. 11 is a plan view of a substrate as viewed from the mounting surface side.

As illustrated in FIG. 11, the substrate 4 is formed in a rectangular shape in plan view. As illustrated in FIGS. 8 and 10, the substrate 4 is disposed parallel to the output shaft 32 of the motor unit 3, and the mounting surface 40 of the substrate 4 extends in the tangential direction of a circle about the axis O of the motor unit 3 (see FIG. 15). Both ends of the substrate 4 in the tangential direction are located at positions protruding in the tangential direction from the outer peripheral contour M (outer peripheral contour of the stator) of the motor unit 3.

A plurality of electronic components 41 are mounted on one surface of the substrate 4. As illustrated in FIG. 11, examples of the electronic components include capacitors (electrolytic capacitors such as aluminum electrolytic capacitors) 41a, CPU 41b, and semiconductor elements (inverter) 41c such as MOS-FETs. In addition, integrated circuits, such as driver ICs, and resistors, are used. As illustrated in FIGS. 9 and 10, the substrate 4 is disposed such that the surface (mounting surface) 40 on which the electronic components 41 are mounted faces the pump unit 2 and the motor unit 3.

The substrate 4 is supplied with power from an external power supply through a connector 42. The polarity of the drive current is controlled in the control circuit on the substrate 4. As illustrated in FIG. 8, the controlled current is supplied to each of the coils 30a in the stator 30 of the motor unit 3 through the bus bar 43 that is connected to the substrate 4. The heat dissipation sheet 44 serving as a heat dissipation member is mounted to a surface 45 of the substrate 4 on the opposite side from the mounting surface 40. The heat dissipation sheet 44 is formed of a highly thermally conductive and compressible material. The heat dissipation sheet 44 is disposed so as to be in contact with high-heat generating components (for example, the semiconductor elements 41c) among the electronic components.

The housing 5 has a cylindrical housing body 50 with openings at both ends, a first lid 51 that closes the opening of the housing body 50 on the pump side in the axial direction, and a second lid 52 that closes the opening of the housing body 50 on the anti-pump side in the axial direction. The first lid 51 and the second lid 52 are fixed to the housing body 50 using the plurality of fastening bolts B1 and B2, respectively.

The second lid 52 has a cylindrical bearing case 52a that supports the bearing 34 on the anti-pump unit side, and a cover 52b that closes the opening of the bearing case 52a on the anti-pump unit side. The sub-substrate 39 is disposed on the inner diameter side of the bearing case 52a. The cover 52b is mounted to the bearing case 52a using a fastening member (not illustrated).

The housing body 50 has the pump accommodation unit 53 that houses the pump unit 2, the motor accommodation unit 54 that houses the motor unit 3, and the substrate accommodation unit 55 that houses the substrate 4, which are integrally formed as a single component. The housing body 50, the first lid 51, and the second lid 52 are formed of a metal material that is a conductor and has good thermal conductivity, for example, an aluminum alloy.

The pump accommodation unit 53 of the housing 5 has a substantially cylindrical shape including the pump case 23 of the pump unit 2. A partition wall 56 that partitions the interior of the housing into the pump unit 2 side and the motor unit 3 side is provided on the inner peripheral surface of the pump accommodation unit 53. The inner peripheral surface of the partition wall 56 extends to a position close to the outer peripheral surface of the output shaft 32. The inner peripheral surface of the partition wall 56 and the outer peripheral surface of the output shaft 32 are in a non-contact state, thereby allowing the rotation of the output shaft 32.

The motor accommodation unit 54 is formed in a cylindrical shape. The stator 30 of the motor unit 3 is press-fitted or adhesively fixed to the cylindrical inner peripheral surface (see FIG. 10) of the motor accommodation unit 54. The bearing 33 on the pump unit 2 side and the seal 35 as described above are attached to the inner peripheral surface of the motor accommodation unit 54 further toward the pump unit 2 side in the axial direction than the motor unit 3. The bearing 33 and the seal 35 are located further toward the anti-pump unit side in the axial direction than the partition wall 56.

Figure 12:
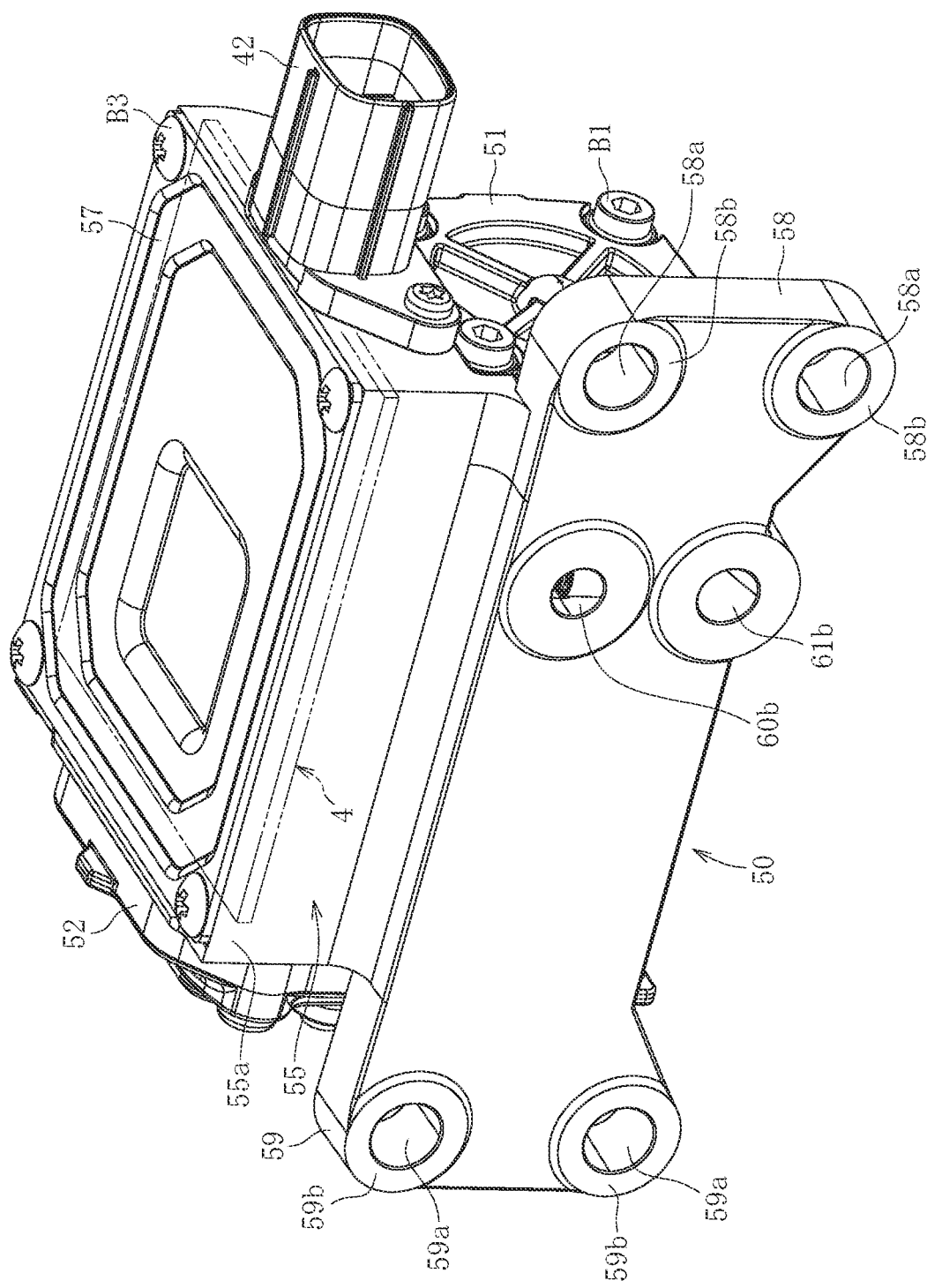
FIG. 12 is a perspective view of the electric oil pump according to the other embodiment.

FIG. 12 is a perspective view of the electric oil pump 1 illustrated in FIG. 8 when viewed upside down from the pump unit 2 side and the substrate accommodation unit 55 side. As illustrated in FIG. 12, the substrate accommodation unit 55 of the housing 5 has a rectangular frame shape when viewed from the radial direction, and has the peripheral wall 55a having an opening on the outer diameter side in the radial direction. The periphery of the substrate 4 disposed in the substrate accommodation unit 55 is surrounded by the peripheral wall 55a. After the substrate 4 is disposed in the substrate accommodation unit 55, the opening of the substrate accommodation unit 55 is closed by a cover 57 serving as a closing unit. The cover 57 is mounted to the housing body 50 using a fastening member B3. The fastening member refers to all bolts including tapping screws. In this state, the cover 57 is in contact with the heat dissipation sheet 44 illustrated in FIG. 8. Thus, heat from the high-temperature electronic components 41 on the substrate 4 can be efficiently released to the cover 57 and even to the housing body 50 through the heat dissipation sheet 44. At this time, since the heat path includes the cover 57 in contact with the outside air, a cooling effect by the outside air can also be expected.

As illustrated in FIG. 8, the bottom surface 55b of the substrate accommodation unit 55 is formed by the outer peripheral surface of the pump accommodation unit 53 and the outer peripheral surface of the motor accommodation unit 54. On the bottom surface 55b, there is a step in the radial direction between the outer peripheral surface of the pump accommodation unit 53 and the outer peripheral surface of the motor accommodation unit 54, and the outer peripheral surface of the pump accommodation unit 53 is located closer to the axis O of the motor unit 3 in the radial direction than the outer peripheral surface of the motor accommodation unit 54.

As illustrated in FIGS. 8 and 12, the flange-shaped mounting portions 58 and 59 for mounting the electric oil pump 1 to a mounting object (transmission case in the present embodiment) to which the electric oil pump 1 is to be mounted are integrally formed on both axial sides of the housing body 50. The two fastening holes 58a are formed in the mounting portion 58 on the pump unit 2 side, and the two fastening holes 59a are formed in the mounting portion 59 on the anti-pump unit side. The electric oil pump 1 is mounted to the mounting object by inserting fastening members (not illustrated) into the fastening holes 58a and 59a and screwing the fastening members into the mounting object.

The flat mounting surfaces 58b and 59b (see FIG. 12) that are brought into contact with the mounting object are formed around the fastening holes 58a and 59a of the mounting portions 58 and 59. The mounting surfaces 58b and 59b are arranged on a common plane that extends in a direction orthogonal to the substrate 4 housed in the substrate accommodation unit 55.

As illustrated in FIG. 8, the oil flow path 6 that is connected to the pump unit 2 is provided in the housing body 50. As the oil flow path 6, a suction-side oil flow path 60 and a discharge-side oil flow path 61 are provided separately from each other.

As illustrated in FIG. 9, the suction-side oil flow path 60 has the suction-side space 60a that opens into the meshing portion between the inner rotor 21 and the outer rotor 22, the suction hole 60b that opens into the surface of the housing body 50, and the suction-side communication path 60c that provides communication between the suction-side space 60a and the suction hole 60b. Similarly, the discharge-side oil flow path 61 has a discharge-side space 61a that opens into the meshing portion between the inner rotor 21 and the outer rotor 22, a discharge hole 61b that opens into the surface of the housing body 50, and a discharge-side communication path 61c that provides communication between the discharge-side space 61a and the discharge hole 61b.

Both the suction-side space 60a and the discharge-side space 61a are provided in the region of the pump unit 2 on the anti-pump unit side in the axial direction within the pump accommodation unit 53. The suction-side space 60a and the discharge-side space 61a both have an arc shape extending in the circumferential direction of the output shaft 32, and are provided at positions facing each other at 180° in the circumferential direction. In the present embodiment, the suction-side space 60a is disposed closer to the substrate 4 than the discharge-side space 61a. Furthermore, as illustrated in FIG. 12, the suction hole 60b and the discharge hole 61b open into the surface of the housing 5 facing the mounting object. The suction hole 60b and the discharge hole 61b are located on a plane containing the mounting surfaces 58b and 59b of the mounting portions 58 and 59. Thus, there is no need to route piping for oil around the electric oil pump 1, and the peripheral structure of the electric oil pump 1 can be simplified.

In the electric oil pump having the above configuration, the inner rotor 21 rotates when the motor unit 3 is driven. As the inner rotor 21 rotates, the outer rotor 22, which is in mesh with the inner rotor 21, is rotated in accordance with the rotation of the inner rotor 21, and the clearances formed between the teeth of the two rotors increase and decrease with the rotation. Therefore, the oil accumulated in the oil reservoir in the transmission case is sucked into the pump unit 2 through the suction-side oil flow path 60, and the sucked oil is discharged into the transmission through the discharge-side oil flow path 61.

The electric oil pump according to the present embodiment having the above configuration has the following features.

As described above, in the electric oil pump according to the present embodiment, the housing 5 (housing body 50) equipped with the pump accommodation unit 53, the motor accommodation unit 54, and the substrate accommodation unit 55 is integrally formed of an aluminum alloy having good thermal conductivity, so that heat conductivity in the housing 5 is improved. This facilitates the transfer of heat from the substrate 4 and electronic components 41 to the housing 5 and the oil circulating in the housing 5. In FIG. 8, part of the path of heat transferred from the substrate 4 is indicated by arrow H.

As described above, in the present embodiment, the heat conductivity from the substrate 4 to the housing 5 is improved, thereby allowing effective heat dissipation from the substrate 4 and the electronic components 41 through the housing 5. Thus, it is possible to effectively suppress the functional degradation and damage of the electronic components 41 due to the temperature rise, and the reliability and durability of the electric oil pump are improved. In addition, in the present embodiment, since the heat dissipation of the substrate can be effectively performed without newly adding a heat dissipation member, significant design changes can be avoided.

Figure 13:
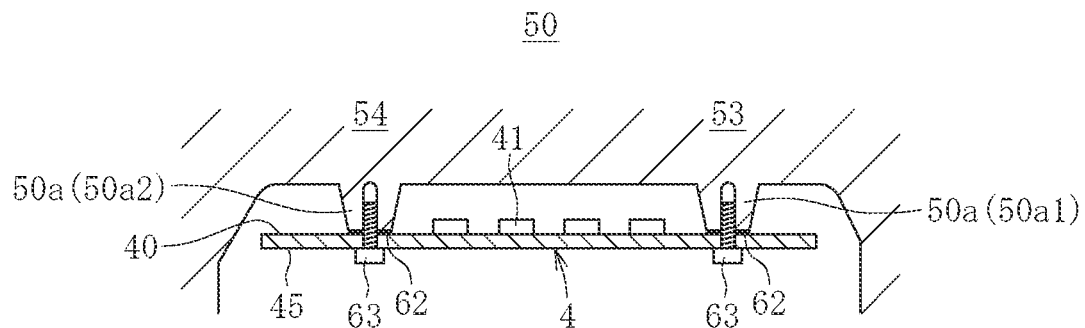
FIG. 13 is a sectional view illustrating a structure for mounting the substrate.

Furthermore, in the present embodiment, as illustrated in FIG. 13, since the substrate 4 is in contact with protruding substrate mounting portions 50a on the housing body 50 with metal foil (copper foil) 62 forming a circuit pattern interposed therebetween, and is fixed by a metal fixture (screw) 63, heat is satisfactorily transferred from the substrate 4 to the housing 5 through these metal members (metal foil 62 and fixture 63). Therefore, the heat dissipation of the substrate 4 and the electronic components 41 is improved.

Furthermore, in the present embodiment, as illustrated in FIG. 13, since the substrate 4 and the substrate mounting portions 50a of the housing body 50 are in contact with each other on the surface of the substrate 4 on the pump accommodation unit 53 side, the heat transfer path from the substrate 4 to the pump accommodation unit 53 is shortened, and the heat of the substrate 4 and the electronic components 41 is easily transferred to the oil in the pump accommodation unit 53. Furthermore, in the present embodiment, among the four substrate mounting portions 50a illustrated in FIG. 11, two substrate mounting portions 50a1 are located further toward the pump accommodation unit 53 side in the direction of the axis O of the motor unit 3 than the other two substrate mounting portions 50a2 (see FIG. 13), and thus, in particular, the heat transfer path through the substrate mounting portions 50a1 on the pump accommodation unit 53 side is shortened. As described above, in the present embodiment, since the configuration in which the heat transfer path from the substrate 4 to the pump accommodation unit 53 is shortened as much as possible is adopted, the heat from the substrate 4 can be efficiently transferred to the pump accommodation unit 53 and the oil inside the pump accommodation unit 53, thereby allowing effective heat dissipation from the substrate 4 and the electronic components 41. That is, the magnitude relationship between the temperatures of the oil, the pump accommodation unit 53, the substrate 4, and the electronic components 41 is oil temperature<temperature of the pump accommodation unit 53<temperature of the substrate 4<temperature of the electronic components 41.

Furthermore, since the present embodiment has the following structural features, an advantageous effect for heat dissipation can be obtained.

Figure 14:
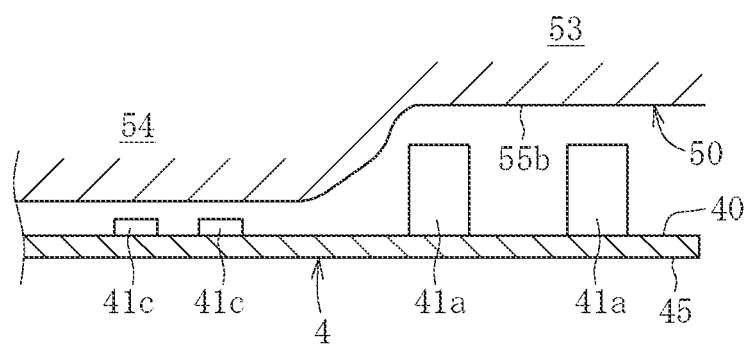
FIG. 14 is a partially-enlarged sectional view of FIG. 8.

As described above, in the present embodiment, since there is a step in the radial direction on the bottom surface 55b of the substrate accommodation unit 55, as illustrated in FIG. 14, the region radially facing the pump accommodation unit 53 can be utilized as arrangement space for tall components (for example, the electrolytic capacitors 41a) among the electronic components 41 on the substrate 4. Meanwhile, short components (for example, semiconductor elements 41c, integrated circuits, or resistors) are intensively arranged in a region that radially faces the motor accommodation unit 54 within the substrate 4.

Thus, the substrate 4 can be disposed close to the bottom surface 55b of the substrate accommodation unit 55. Therefore, the electric oil pump 1 can be downsized (thinned) in the direction orthogonal to the substrate 4, and the heat transfer path from the substrate 4 to the pump accommodation unit 53 is shortened, so that the heat from the substrate 4 and the electronic components 41 can be satisfactorily transferred to the oil in the pump accommodation unit 53. Furthermore, in order to obtain this effect, as shown in FIG. 8, the outer dimension d of the pump unit 2 is preferably smaller than the outer dimension D of the motor unit 3 (d<D).

Figure 15:
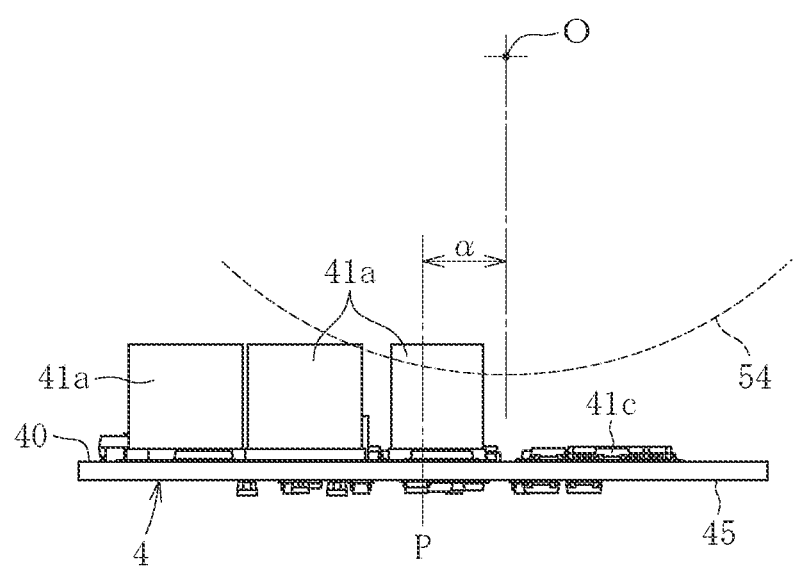
FIG. 15 is a side view of the substrate as viewed from the axial direction of a motor unit.

Furthermore, in the present embodiment, as illustrated in FIG. 15, since the substrate 4 is disposed along the tangential direction of the circle about the axis O of the motor unit 3, the electric oil pump 1 can be downsized (thinned) in the direction orthogonal to the substrate 4. Furthermore, in the tangential direction, both ends (right end and left end in the drawing) of the substrate 4 extend to the region on both sides sandwiching the axis O of the motor unit. Therefore, at the end of the substrate 4 in the tangential direction, the distance from the cylindrical outer peripheral surface of the motor accommodation unit 54 is greater than at the center. Therefore, both ends of the substrate 4 in the tangential direction can be used as arrangement space for the tall components (electrolytic capacitors 41a).

In particular, in the present embodiment, as illustrated in FIG. 15, the center P of the substrate 4 in the tangential direction is offset in the tangential direction with respect to the axis O of the motor unit 3 (offset width α). Therefore, the distance to the outer peripheral surface of the motor accommodation unit 54 can be further increased at one of the substrate ends in the tangential direction. Thus, it is possible to reliably secure installation space for the electrolytic capacitors 41a, which are tall components, at one end of the substrate 4 in the tangential direction, thereby making it easier to downsize the electric oil pump 1 in the direction orthogonal to the substrate 4. As described above, in the present embodiment, since the electric oil pump 1 in the direction orthogonal to the substrate 4 can be downsized, heat transfer from the substrate 4 to the pump accommodation unit 53 is improved, and heat dissipation from the substrate 4 and the electronic components 41 can be more effectively performed.

Note that the present invention is not limited to the above-described embodiments, and various modifications can be made without departing from the gist of the invention.

In the above-described embodiments, the case where the present invention is applied to the electric oil pump has been described as an example, but the present invention is not limited to the case where the present invention is applied to an electric pump using oil. The present invention is also applicable to electric fluid pumps that deliver fluids other than oil, such as water pumps that deliver cooling water.

REFERENCE SIGNS LIST

1 Electric oil pump
2 Pump unit
3 Motor unit
4 Substrate (main substrate)
5 Housing
6 Oil flow path
21 Inner rotor
22 Outer rotor
30 Stator
31 Rotor
33 Bearing
35 Seal
41 Electronic component
41a, 41b Tall component
41c Short component
44 Heat dissipation member (heat dissipation sheet)
50 Housing body
53 Pump accommodation unit
54 Motor accommodation unit
55 Substrate accommodation unit
55b Bottom surface
57 Closing unit (cover)
60 Suction-side oil flow path
60a Suction hole
61 Discharge-side oil flow path
61a Discharge hole
62 Metal foil (metal member)
63 Fixture (metal member)
O Axis of motor unit
P Center of substrate

The invention claimed is:

1. An electric oil pump comprising:
a pump unit that generates hydraulic pressure;
a motor unit that drives the pump unit;
a substrate on which a control circuit for controlling the motor unit is formed by a plurality of electronic components; and
a housing equipped with a pump accommodation unit that houses the pump unit, a motor accommodation unit that houses the motor unit, and a substrate accommodation unit that houses the substrate,
wherein the substrate is disposed along a tangential direction of a circle about an axis of the motor unit,
wherein the pump accommodation unit, the motor accommodation unit, and the substrate accommodation unit are integrally formed,
wherein the pump unit and the motor unit are axially aligned, and the substrate is disposed so as to straddle the pump unit and the motor unit,
wherein an outer peripheral surface of the pump accommodation unit and an outer peripheral surface of the motor accommodation unit are provided on a bottom surface of the substrate accommodation unit, and
wherein the outer peripheral surface of the pump accommodation unit is disposed closer to the axis of the motor unit than the outer peripheral surface of the motor accommodation unit.

2. The electric oil pump according to claim 1, wherein the housing is further equipped with a housing body that is configured by the pump accommodation unit, the motor accommodation unit, and the substrate accommodation unit being integrally formed, a suction hole and a discharge hole for oil are provided in a surface of the housing body, and a suction-side oil flow path connecting the suction hole and the pump unit and a discharge-side oil flow path connecting the discharge hole and the pump unit are provided in the housing body.

3. The electric oil pump according to claim 2, wherein at least one of the suction hole and the discharge hole is disposed between the pump unit and the motor unit.

4. The electric oil pump according to claim 1, wherein
the housing is further equipped with a housing body that is configured by the pump accommodation unit, the motor accommodation unit, and the substrate accommodation unit being integrally formed, and
the housing body is formed of a conductive metal material.

5. The electric oil pump according to claim 1, wherein an outer dimension of the pump unit is smaller than an outer dimension of the motor unit.

6. The electric oil pump according to claim 1, wherein the substrate is equipped with, as the electronic components, a tall component and a short component that is shorter than the tall component, and the tall component is disposed to face the outer peripheral surface of the pump accommodation unit.

7. The electric oil pump according to claim 1, wherein a center of the substrate in the tangential direction is offset in the tangential direction from the axis of the motor unit.

8. The electric oil pump according to claim 1, further comprising a closing unit, wherein an opening is provided in the substrate accommodation unit, the closing unit closes the opening of the substrate accommodation unit, and a heat dissipation member is interposed between the substrate and the closing unit.

9. The electric oil pump according to claim 8, wherein the closing unit is disposed in contact with outside air.

10. The electric oil pump according to claim 1, wherein the pump accommodation unit, the motor accommodation unit, and the substrate accommodation unit are integral metal members.

11. The electric oil pump according to claim 10, wherein metal foil is interposed between the substrate and the housing.

12. The electric oil pump according to claim 10, wherein the substrate is fixed to the housing by a metal fixture.

13. The electric oil pump according to claim 10, wherein the substrate and the housing are in contact with each other on a surface of the substrate on a pump accommodation unit side.

14. The electric oil pump according to claim 10, wherein
the housing has a plurality of substrate mounting portions to which the substrate is mounted, and
some of the plurality of substrate mounting portions are arranged further toward a pump accommodation unit side than other of the plurality of substrate mounting portions.

* * * * *